United States Patent [19]

Shivers, Jr. et al.

[11] 4,271,879
[45] Jun. 9, 1981

[54] HYDRAULIC STUMP CUTTING AND DIGGING APPARATUS

[75] Inventors: Norman E. Shivers, Jr.; David E. Shivers, both of Los Angeles; Paul N. Shivers, Alhambra, all of Calif.

[73] Assignee: Deborah Shivers, Los Angeles, Calif.

[21] Appl. No.: 13,435

[22] Filed: Feb. 21, 1979

[51] Int. Cl.³ .............................................. A01G 23/06
[52] U.S. Cl. .............................. 144/2 N; 24/263 A; 37/2 R; 56/119; 269/287; 299/75
[58] Field of Search ............... 37/2 R, 2 P, 94, 189, 37/DIG. 6; 248/70, 74 R; 280/762, 770; 269/287, 126; 299/39, 75; 24/263 A; 56/119

[56] References Cited

U.S. PATENT DOCUMENTS

| | | | |
|---|---|---|---|
| 2,860,476 | 11/1958 | Francis et al. | 56/119 |
| 2,865,591 | 12/1958 | Holinshead | 269/287 X |
| 2,933,294 | 4/1960 | Meehan, Jr. | 299/75 X |
| 3,308,860 | 3/1967 | DeShano | 144/2 N |
| 3,568,740 | 3/1971 | Speakman | 144/2 N |
| 3,685,557 | 8/1972 | Groce | 144/2 N |
| 3,732,905 | 5/1973 | Pickel | 144/2 N |
| 3,785,705 | 1/1974 | Binger et al. | 299/75 |
| 3,935,887 | 2/1976 | Van Zante et al. | 144/2 N X |
| 4,074,447 | 2/1978 | Shivers, Jr. et al. | 144/2 N X |

FOREIGN PATENT DOCUMENTS 996007 8/1976 Canada ................................. 144/2 N Primary Examiner—W. Donald Bray
Attorney, Agent, or Firm—Frank A. Frisenda, Jr.

[57] ABSTRACT

A hydraulic stump cutting and earth digging apparatus including a balanced main supporting frame of a vehicle member and an adjustable telescopic channel frame cutter boom, the boom comprising a forward centrally disposed rotatable cutting wheel having a plurality of radially extending cutting teeth circumferentially mounted thereon. The channel frame cutter boom further includes a hydraulic motor contiguously mounted with the cutting wheel and having a common axis for rotation. A double pump and motor for circulation of hydraulic fluid to the hydraulic components of the apparatus is mounted on the main supporting frame thereby providing a telescopic cutter boom which is lighter in weight and more accessible to tighter places than conventional hydraulic stump cutters. In one embodied form the adjustable telescopic channel frame cutter boom is provided with flexible sideflaps which permits the removal of tree stumps situated close to permanent obstructions yet provides an effective means for controlling cut material through the channel frame of the boom.

38 Claims, 13 Drawing Figures

HYDRAULIC STUMP CUTTING AND DIGGING APPARATUS

BACKGROUND OF THE INVENTION

This invention relates to a hydraulic stump cutting and earth digging device and has particular reference to an apparatus which is capable of removing relatively large diameter tree stumps composed of hardwood and the like.

In an earlier patented invention, U.S. Pat. No. 4,074,447 issued to Shivers, Jr. et al for STUMP CUTTING AND PRECISION DIGGING APPARATUS, the present inventors described a non-hydraulic stump cutter and earth ripper device having a balanced channel frame chassie. The invention provides a compact, light weight, portable device which possesses accurate manual control, efficient operation and has the virtue of relatively low cost manufacture.

However, the removal of tree stumps having large diameters such as a diameter of more than 40 inches, and/or composed of hardwood such as oak, walnut and the like requires a more powerful stump cutter usually provided with a hydraulic fluid control system.

Conventional hydraulic stump cutting and digging devices, while satisfying the requirement for power, generally have been of bulky construction particularly with respect to the cutter boom. This construction prevents the cutter boom from removing tree stumps close to permanent obstructions such as building structures and prevents the device from being transported through, for instance, narrow gates of fenced backyards. Accordingly, those skilled in the art have recognized a significant need for a hydraulic stump cutting and digging apparatus which overcomes the foregoing difficulties.

In an effort to meet this need, the present inventors have developed the instant invention which again provides the advantages of relatively light weight construction, efficient operation and provides a hydraulic stump cutter which is accessible to tight places. Moreover, the present invention provides a multidirectional adjustable telescopic cutter boom which is a adaptable as a removable attachment for other hydraulic powered equipment such as backhoes and the like.

SUMMARY OF THE INVENTION

The hydraulic stump cutting/earth digging apparatus of the present invention includes a mobile vehicle member having a main supporting frame and a multidirectional telescopic channel frame cutter boom mounted on the main supporting frame. The cutter boom has an integral elongated channel which acts as a guide for controlling cut material. A cutting wheel is mounted on the cutter boom and longitudinally aligned with the channel for rotation about a horizontal axis transverse to the channel. The cutting wheel has a plurality of radially extending cutting teeth circumferentially mounted on the cutting wheel. Suitable hydraulic drive means for powering the cutting wheel is mounted contiguously with the cutting wheel and has a common axis for rotation to cut and to convey the cut material through the elongated channel of the cutter boom. A double pump and motor for circulation of hydraulic fluid to the hydraulic components, including a plurality of piston-cylinders, of the apparatus is mounted on the main supporting frame thereby providing a telescopic cutter boom which is lighter in weight and more accessible to tighter places than conventional hydraulic stump cutters.

In one embodied form, the telescopic channel frame cutter boom is provided with flexible side flaps composed of a material such as rubberized canvas to enable the boom to remove tree stumps situated close to permanent obstructions such as building structures and the like, yet still provides an effective means for controlling cut material through the channel frame of the boom.

The channel frame and cutter wheel with hydraulic motor may be mounted on a swivel head for complete 360 degree range of positioning by provision of two support mounting plates with cooperating bolt and aperture securement. This enables the cutter wheel to be positioned at any one of many different angles for precision cutting and digging chores.

In a preferred embodiment, the adjustable telescopic channel frame cutter boom is removably attached to the main supporting frame of the apparatus and is adaptable as an attachment for other hydraulic powered equipment such as backhoes and the like.

In yet another preferred embodied form, the main supporting frame of the present apparatus includes an adjustable "dozer" guard for wheels which enables accumulated saw dust to be pushed away from the wheels as the apparatus moves in a forward direction during cutting of a stump. This embodied feature assures that the apparatus will not ride up on a mound of accumulated sawdust thereby commensurately lessening full depth of the cut made by the cutter boom.

In a further preferable feature of the present invention, a hydraulic fluid storage tank mounted on the main supporting frame comprises an internal "T" baffle to provide a tank which is shorter in length but defining a sufficiently long cooling path for recirculated fluid. This design minimizes possible air intake to the hydraulic system which can cause the pump motor and/or hydraulic motor of the cutting wheel to cavatate.

Accordingly, the present hydraulic stump cutting and earth digging device provides an apparatus that is readily adaptable to varying conditions encountered during operation together with the features of safety and relatively light weight construction.

Other advantages and objects of the present invention will become apparent from the accompanying more detailed description and drawings.

DESCRIPTION OF THE PREFERRED EMBODIMENTS

Figure 1:
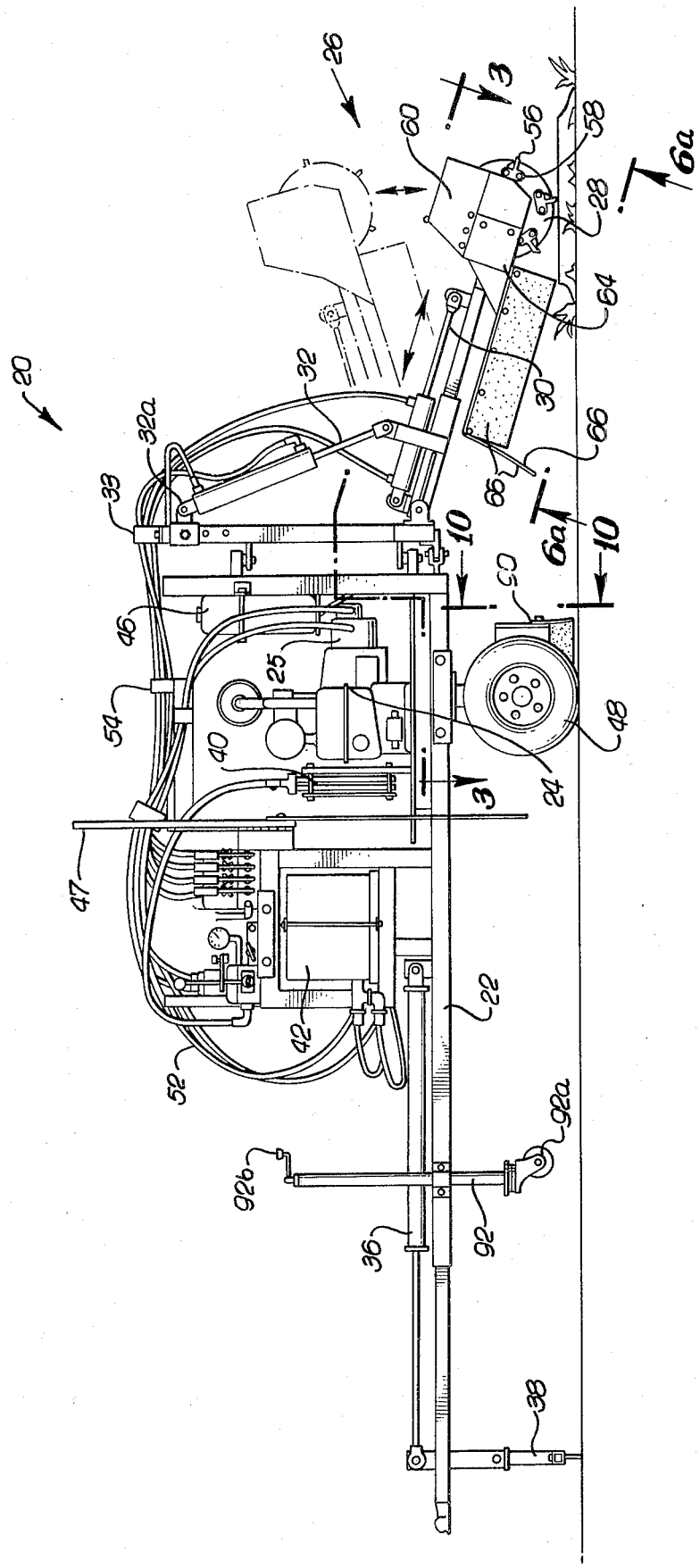
FIG. 1 is a side elevational view of a stump cutting and earth digging apparatus in accordance with the present invention.

Referring now to the drawings, and with particular reference to FIG. 1 there is shown a hydraulic stump cuttng and earth digging device, generally denoted 20, in accordance with the present invention. The apparatus includes two major components namely, a main supporting frame 22 of a vehicle member which carries a double hydraulic pump 24 and motor 25 for circulation of hydraulic fluid to the hydraulic powered features of the device and an adjustable telescopic channel frame cutter boom 26 which carries a separate hydraulic motor contiguously mounted with cutter wheel 28 for driving the forward centrally disposed cutting wheel 28.

Figure 2:
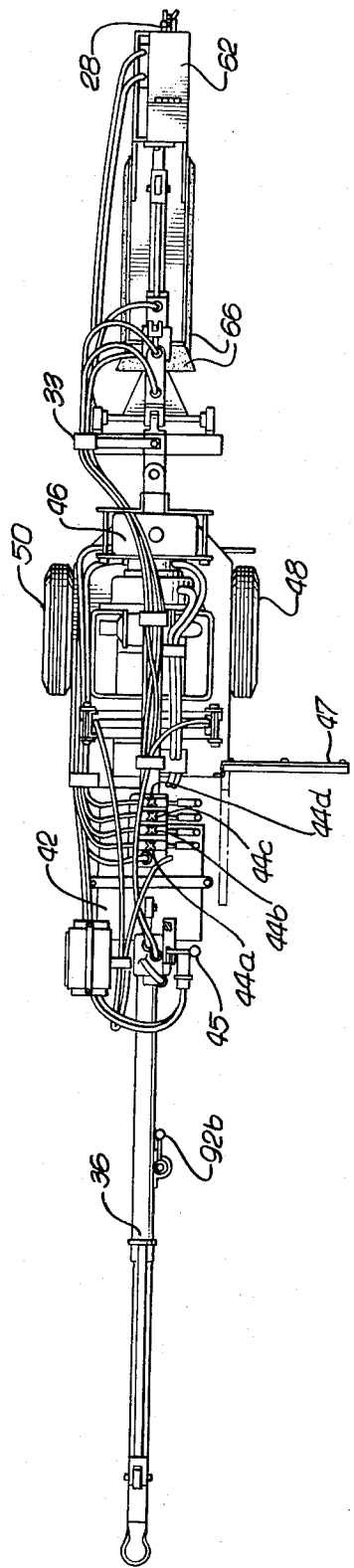
FIG. 2 is a top planar view, further illustrating the stump cutting/earth digging device in accordance with the present invention.
Figure 3:
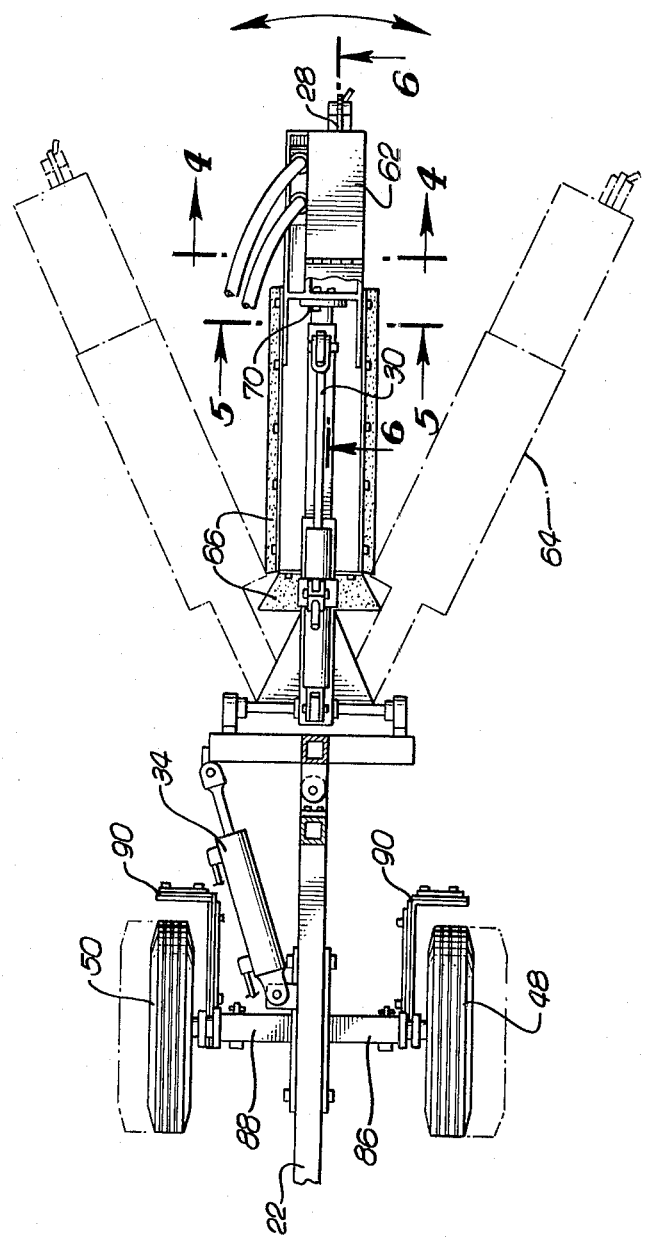
FIG. 3 is an enlarged top planar view showing the multidirectional telescopic channel frame cutter boom and respective telespcopic and adjustable axle mounting of the pnuematic tires of the main supporting frame of the apparatus.

In more detail, as shown in FIGS. 1, 2 and 3 the main supporting frame 22 carries the double pump 24 for circulation of hydraulic fluid at a rate of at least 25 gallons per minute to the hydraulic cutter wheel motor and a rate of at least six gallons per minute for powering the other hydraulic features of the device for multidirectional telescopic movement of the cutter boom 26, and powered forward movement of the supporting frame 22. A suitable double hydraulic pump and motor is of 25 horse power size. However, it will be appreciated by the those skilled in the art, that any suitable circulation means such as two separate pumps and motors could be utilized for circulating the hydraulic fluid through the apparatus but will generally result in a less compact structure.

The hydraulic features of the device comprise hydraulic means 30 and 32, mounted on the cutter boom 26, which provide extendable/retractable forward movement and vertical movement of the cutter boom 26, respectively. Additionally, hydraulic means 34 and 36, mounted on the main supporting frame 22, respectively, provide lateral movement of the cutter boom 26 and powered forward movement of the frame 22 with cutter boom 26 when stake 38 is temporarily driven into the ground to establish a fixed working site.

In one embodied form, as shown in FIG. 1 hydraulic means 32 may be adjustably mounted with upstanding support leg 33 to provide an increase in the range of arc of the cutter boom 26. Accordingly, support leg 33 at its upper portion includes multiple vertically spaced mounting sites such as a series of apertures or the like for removable attachment of the cylinder's pivot bearing 32a. Thus when a lower mounting site is selected on upstanding support leg 33, cutter boom 26 is capable of effecting an increased depth of cut.

The main supporting frame 22 further carries a heat exchanger 40 for cooling only the hydraulic fluid recycled from the hydraulic cutting wheel motor. In this respect, a 25 gallon twin heat radiator has been found to suitably meet the cooling requirements and a further description of this component may be found in U.S. Pat. No. 3,887,004 which is hereby incorporated by this reference. A storage tank 42 is provided on the frame 22 for storing the hydraulic fluid of the system. Preferably, the tank 42 is internally provided with a "T" baffle defining a suitable cooling path for fluid recycle within the tank 42 which will be described in greater detail in the following description.

The main supporting frame 22 also includes hydraulic control valves 44a, b, c, d and 45, a fuel tank 46, ignition system: battery, solenoid and starter which are all appropriately positioned on the main frame 22 to provide an overall balanced relationship with respect to the channel frame cutter boom 26. In this regard, bearing strut 49 midway between a pair of pneumatic tires 48 and 50 may be viewed as the fulcrum for the balanced positioning of the components mounted on the frame 22 with respect to the cutter boom 26.

More particularly, the series of hydraulic control valves 44a, b, c and d each independently regulate the hydraulic means 32, 34, 36 and 38. Whereas hydraulic control valve 45 is used to regulate the speed of rotation of the cutter wheel 28. Optionally, a swingable mounted plexiglass shield 47 is positioned near the control valves 44 for operator safety.

The several hoses typically denoted 52 for the hydraulic system are preferably positioned by use of at least one clamping means such as adjustable clamps 54 for secured positioning of hydraulic hoses 52 on the apparatus 54. Optionally, a magnetic filter for the removal of large unwanted particles from the hydraulic fluid is mounted on the frame 22 and may be supplemented by the additional use of a filter for dirt removal internally fitted in the return hose to hydraulic fluid storage tank 42.

Further, as seen in FIGS. 1, 2 and 3 the device 20 includes a forwardly disposed cutting means, which may generally be described as a rotatable cutting wheel 28, having a plurality of radially extending cutting teeth 56 circumferentially mounted thereon by a plurality of compressively adjustable clamp elements 58. The teeth 56 are preferably composed of steel carbide or other durable material and positioned and secured in a optimum configuration subsequently described in greater detail. The cutting wheel 28 is provided with a partial encasement 60 including a removable top cover 62 for inspection and cleaning of the cutting wheel 28, teeth 56 and pocket elements 58, when necessary.

Figure 4:
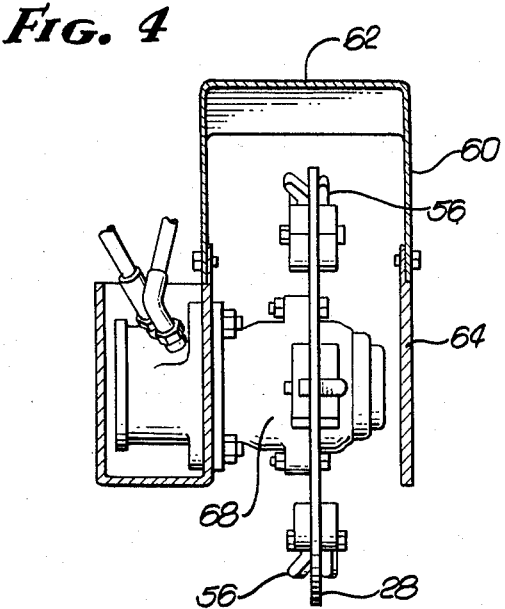
FIG. 4 is an enlarged sectional view taken substantially along line 4—4 of FIG. 3 and showing the cutter wheel with hydraulic motor of the apparatus.
Figure 6:
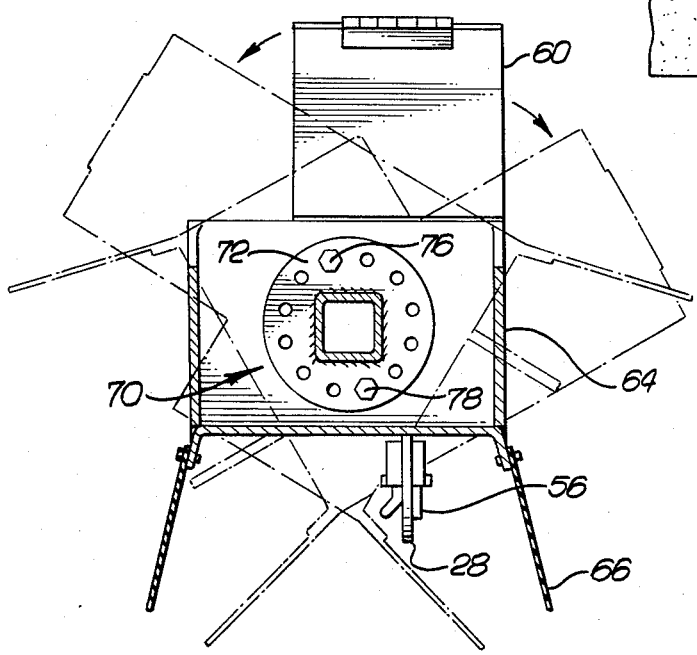
FIG. 6 is an enlarged rear view taken substantially along line 6—6 of the FIG. 3 and showing the respective adjustable positions of the swivel head mounting shown in FIG. 5.
Figure 6A:
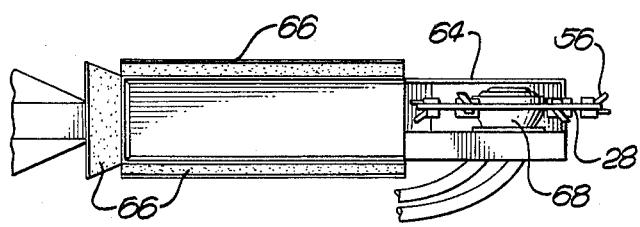
FIG. 6a is an enlarged view of the underside of the telescopic channel frame cutter boom in accordance with the present invention.

The adjustable telescopic channel frame cutter boom 26 as best shown in FIGS. 1,4 and 6a is a preferred construction of the boom as the channel frame 64 provides an efficient means for controlling the propelled sawdust and dirt from the cutting wheel 28 during operation of the apparatus. Accordingly, the sawdust and dirt are propelled by cutting wheel 28 to the rear of the channel frame 64 where it is stopped by a rubberized canvas flap 66 attached to the end of channel frame 64.

In a preferred embodied form, the channel frame 64 includes flexible side flaps 66 for instance composed of rubberized canvas or the like which enables the boom to perform cutting tasks close to permanent obstructions such as buliding structures, while at the same time still providing the beneficial control of propelled sawdust and dirt from the cutter wheel 28. However, it should be realized that other suitable materials could be used for constructing the sides of channel frame 64.

In more detail and with reference to FIGS. 4 and 6a the telescopic channel frame cutter boom 26 includes a separate hydraulic motor 68 for powering the cutting wheel 28. The hydraulic motor 68 is continguously mounted with the cutting wheel 28 and has a common axis for rotation thereby eliminating the need for drive belts or chains which would otherwise be required to translate rotary motion of a motor drive shaft to a rotatable cutting wheel if the motor were not so mounted. A particularly suitable motor is a high torque-low speed hydraulic motor for this application delivering about 19 horse power and producing a wheel speed rotation of about 1500 rpm.

Figure 5:
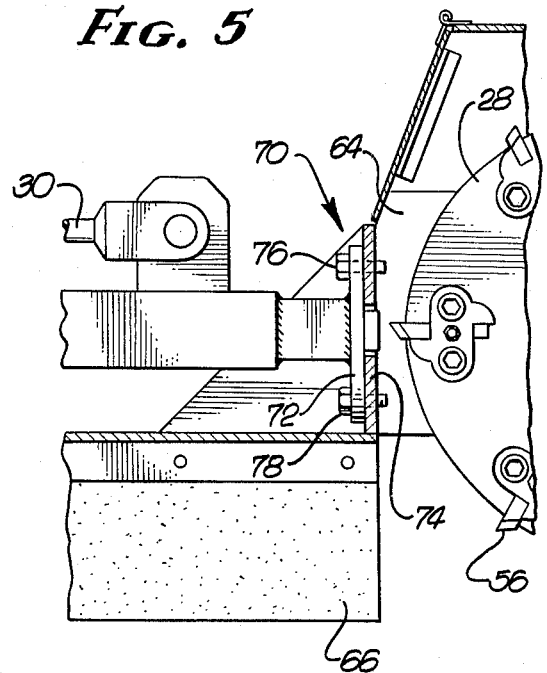
FIG. 5 is an enlarged fragmentary side view taken substantially along line 5—5 of FIG. 3 showing the swivel head mounting of the channel frame cutter wheel.

FIGS. 5 and 6 illustrate an embodied swivel head 70 for channel frame 64, cutter wheel 28 and hydraulic motor 68. The swivel head 70 includes a pair of adjustable support plates 72 and 74. More particularly, plate 72 and 74 are provided with a series drilled apertures, preferrably spaced at 15 degree intervals about the entire marginal portion of the respective plate circumferences. Accordingly, cooperating threaded bolts 76 and 78 engaged the aforementioned aperatures of plates 72 and 78 to fix the desired cutting angle. In this regard, when an operator of the present device desires to change the cutting angle, the bolts 76 and 78 are removed and plate 74 is rotated to desired position and again fixed by securing the bolts 76 and 78 within the apertures of the support plates 72 and 74.

Figure 7:
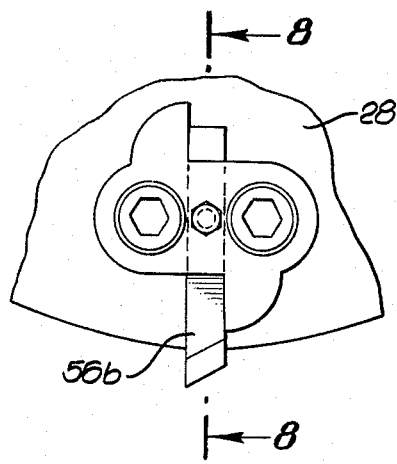
FIG. 7 is a detailed fragmentary side view of a cutting tooth secured on a portion of the cutting wheel by suitable mounting means.
Figure 8:
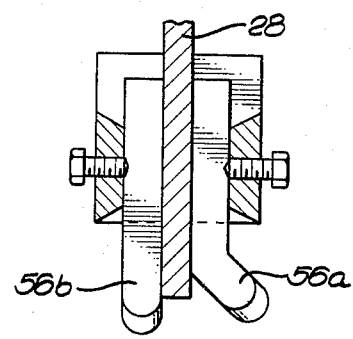
FIG. 8 is a cross-sectional view taken substantially along line 8—8 of FIG. 7 further illustrating the mounting of the respective cutting tooth on the aforementioned cutting wheel.

Referring now to FIGS. 7 and 8 there is illustrated a mounting configuration for cutting teeth 56 of the cutting wheel 28 in accordance with the present invention. Moreover, the instant inventors have discovered that the amount of protrusion beyond the radial edge of cutting wheel 28 and angle of orientation of the cutting teeth 56 with respect to the planar side surface of the cutting wheel 28 are critical factors in the resulting efficiency of the apparatus.

As shown in FIGS. 7 and 8, it was determined that the most efficient cut was obtained from the cutting wheel 28 when one of the cutting teeth 56a was oriented at a 45degree angle from the planar side surface of the cutting wheel 28, while the other cutting tooth 56b is maintained parallel to the planar side surface of the cutting wheel 28. The cutting wheel 28 preferably comprises about six pair of cutting teeth 56 mounted in stagered configuration on the wheel 28. In more detail, the first pair of cutting teeth 56 mounted on the wheel 28 will include one right angled cutting tooth 56a with one parallel cutting tooth 56b, followed by a pair of parallel cutting teeth 56 next followed by a pair of cutting teeth including one left angled cutting tooth (not shown) and one parallel cutting tooth 56b. This sequence is repeated to yield a total of six pair of cutting teeth mounted on the wheel 28. Moreover, it was determined that an optimum cut was achieved when each tooth in the pair of cutting teeth extended one quarter inch beyond the radial edge of the cutting wheel 28. However, it was also determined that the tooth projections could be varied within limits of one-half inch and still produce acceptable results. The cutting teeth 56 and clamp elements 58 are suitably secured to the cutting wheel 28 by a plurality of bolts. For a further description of a similar mounting arrangement reference may be had to the aforementioned U.S. Pat. No. 4,074,447.

Figure 9:
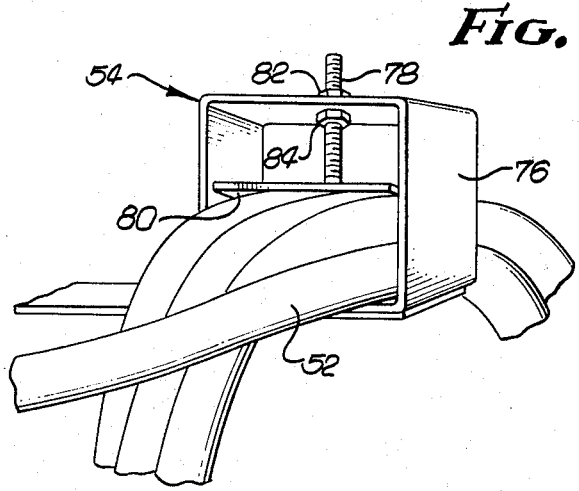
FIG. 9 is a prespective view of a preferred compressively adjustable clamp for securing hydraulic hoses of the apparatus.

FIG. 9 depicts a perferred compressively adjustable clamp 54 for secured positioning of hydraulic hoses 52 in accordance with the present invention. In more detail, the clamp 54 comprises a hollow generally rectangular housing 76, a threaded bolt 78 carrying lower clamp plate 80 and a top and bottom turn nut 82 and 84, respectively. As shown in FIG. 9, upper free end of threaded bolt 78 is disposed through the upper portion of housing 76 and may be suitably adjusted to apply the desired compressive force on hoses 52 by means of top and bottom turn nuts 82 and 84.

Figure 10:
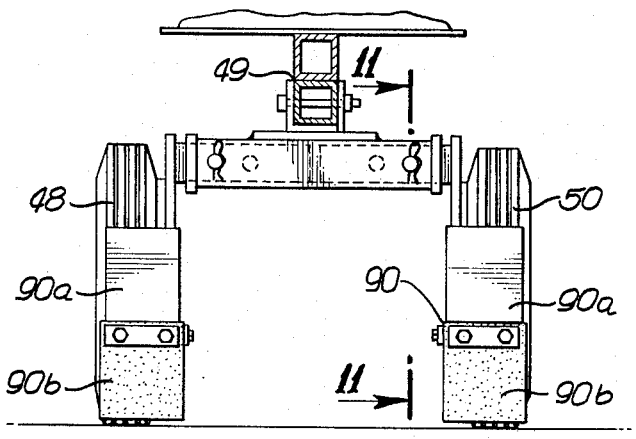
FIG. 10 is an enlarged fragmentary front view of an adjustable "dozer" guard for wheels of the main supporting frame of the apparatus.

As shown in FIGS. 1, 3 and 10 the pair of conventional pnuematic tires 48 and 50 are adjustably mounted on individual axles 86 and 88 to medially support the main frame 22. In this regard, strut bearing 49 situated midway between the pnuematic tires 48 and 50 acts as a fulcrum for the balancing of the components of the apparatus 20 and thereby provides for easier and surer handling of the apparatus. The mounting of tires 48 and 50 on separate and individually adjustable axles 86 and 88, respectively, provides for a wide range of adjustment in the vertical and horizontal mounting demensions. Each of the axles 86 and 88 preferably includes means for telescoping the length of the axle. A further description of this mounting structure may be had by reference to the inventors' U.S. Pat. No. 4,074,447. Accordingly, the mounting width of the pnuematic tires 48 and 50 may be adjusted to a desired span and allow small and large diameters tree stumps to be removed with sufficient support for the present device. Further, in accordance with the foregoing features, the instant apparatus can be readily adapted to varying conditions of terrain encountered during operation.

Figure 11:
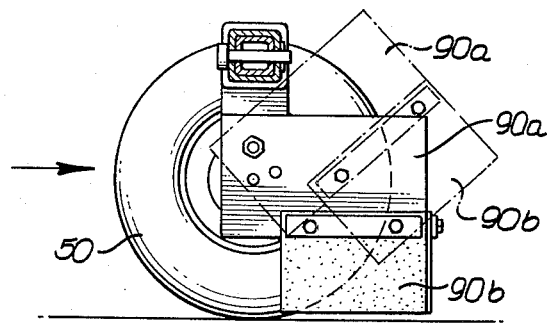
FIG. 11 is an enlarged side view taken substantially along line 11—11 of FIG. 10 further illustrating the adjustable "dozer" guard.

Additionally, FIGS. 10 and 11 illustrate an embodied "dozer" wheel guard 90 suitably mounted on the axles 86 and 88. The guard 90 is composed of top plate 90a and bottom flap 90b which serves to push accumulated sawdust away from the wheels 48 and 50 of the device, when the guards are properly positioned. This feature is particularly desirable since if the device 20 rides up on a mound of accumulated sawdust, the depth of the cut from the cutting wheel 28 will be commensurately lessened. The guards 90 are rotatably pivoted about adjustable telescopic axles 86 and 88 for quick and easy positioning.

To facilitate the adjustment of the aforementioned axles 86 and 88 and to facilitate the temporary driving of stake 38 into the ground, the present apparatus may also include hydraulic or manual powered lifting means 92 to elevate and support the main frame member 22. Hence, for instance when it is necessary to change the vertical height or horizontal span of the wheel axles 86 and 88, the operator will lower the movable base support 92a of the lifting means 92 by rotating a handle 92b in a manner similar to that of a conventional jack mechanism.

Figure 12:
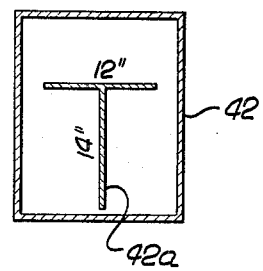
FIG. 12 is an top cross-sectional view of a preferred internally mounted "T" baffle for a hydraulic fluid storage tank mounted on the main supporting frame of the apparatus of the present invention.

In yet another embodied feature as shown in FIG. 12, the storage tank 42 for hydraulic fluid of the apparatus, may be provided with an internally mounted "T" baffle 42a which allows for a more compact and shorter fluid storage tank while at the same time providing a sufficient cooling path for fluid recycle. This construction minimizes air intake to the hydraulic system which can cause the pump motor 26 and hydraulic cutting wheel motor 68 to cavate. For the aforedescribed sized components, a total path of 38 inches was determined to be a suitable distance to insure that the recirculated, hydraulic fluid, especially derived from means 30, 32, 34 and 36 which does not flow through heat exchanger 40, had cooled sufficiently before recycling to the hydraulic powered components of the device. In this regard, the 38 inch perimeter of the "T" baffle 42a is preferably achieved by a central leg of 14 inches and a top leg of 12 inches.

Although the foregoing description of the apparatus of the present invention describes particular parameters for the components it should be understood that the present invention is not to be limited to the use of these particular components. Moreover, any power means contiguously mounted and capable of exerting sufficient drive on the cutting wheel can be utilized.

In a preferred mode of operation, the user stands behind the guard 47 in a position so as to manipulate the control valves 44a–d and 45 of the hydraulic system. Accordingly, for cutting stumps or other removable obstructions, the operator regulates the control valves 44a–d and 45 so as to start the cutting wheel 28 at the rear of the stump and by use of the valves 44a–d telescopes and moves the channel frame cutter boom 26 from side to side with a lateral motion, the apparatus 20 being pivoted about wheels 48 and 50. By regulation of control valve 45, the cutting wheel 28 rotates and proceeds to chip away at the stump.

It is noted that by appropriate selection of means 30, 32, 34 and 36 the present apparatus can remove stumps having a diameter of 40 inches or more. For instance, this combined telescoped distance may be achieved with 30 inch reach provided from the means 36 and 14 inch reached provided by means 30. The total depth of the cut achieved may also be greater than 28 inches by appropriate selection of a mounting site for means 32 on upstanding leg 33. In turn, the operator regulates the apparatus 20 and continues the side to side motion of the cutter boom 26 until the first level of the stump is chipped away. Subsequently, the operator moves the cutting wheel 28 above and toward the rear of the stump whereby the foregoing cutting procedure is repeated until each desired level of the stump is chipped away.

Alternatively, for digging trenches and the like, the operator lowers the cutting wheel 28 to the ground and regulates control valves 44a–d and 45 to apply a slight downward pressure. As the earth is ripped to the desired depth, the operator may also extend the reach of the boom 26 temporarily driving stake 38 into the ground and regulating the control valves 44 to cause the main frame 22 to move forward.

Thus, in accordance with the present invention, the balanced and relatively light weight construction of the device provides an extremely efficient means for removing tree stumps and for digging trenches, in a safe and convenient manner.

Various changes coming within the spirit and scope of our invention may suggest themselves to those skilled in the art. Hence, we do not wish to be limited by the specific embodiments shown and described or uses mentioned, but intend the same to be merely exemplary. The scope of the invention is to be limited only by the appended claims.

We claim:
1. A hydraulic stump cutting and digging apparatus comprising in combination:
   a mobile vehicle member having a main supporting frame;
   a multidirectional telescopic channel frame cutter boom mounted on said main supporting frame, said cutter boom having an integral elongated channel which acts as a guide for controlling cut material;
   a cutting wheel mounted on the cutter boom and longitudinally aligned with the channel for rotation about a horizontal axis transverse to said channel, said cutting wheel having a plurality of radially extending cutting teeth circumferentially mounted on the cutting wheel; and
   hydraulic drive means for powering said cutting wheel mounted contiguously with said cutting wheel and having a common axis for rotation to cut and to convey the cut material through said elongated channel to said cutter boom, said elongated channel and said cutting wheel with drive means being mounted on rotatably adjustable mounting means.

2. The apparatus as defined in claim 1 wherein said rotatably adjustable mounting means comprises two support mounting plates, with adjustable cooperating bolt and aperture securement.

3. The apparatus as defined in claim 1 further including a pair of wheels which balance and medially support said main supporting frame.

4. The apparatus as defined in claim 3 wherein each wheel of said pair of wheels is mounted on a separate and individually adjustable axle.

5. The apparatus as defined in claim 4 wherein said individually adjustable axle includes means for telescoping the length of said axle.

6. The apparatus as defined in claim 3 and further including a rotatably adjustable guard mounted on said axle for pushing accumulated cut material away from the wheels of the apparatus as the apparatus moves in a forward direction.

7. The apparatus as defined in claim 1 wherein said channel frame of said cutter boom includes flexible side flaps.

8. The apparatus as defined in claim 1 wherein said channel frame telescopic cutter boom is removably attached to said main supporting frame.

9. The apparatus as defined in claim 1 and further including a hydraulic fluid storage tank mounted on said main supporting frame said storage tank comprising an internally mounted "T" baffle.

10. The apparatus as defined in claim 1 and further including a pump, motor and heat exchanger mounted on the main supporting frame for circulation of hydraulic fluid and cooling recirculated fluid from hydraulic components of the apparatus.

11. The apparatus as defined in claim 1 and further including at least one hydraulic piston-cylinder mounted on the channel frame telescopic cutter boom to provide forward and rearward movement of the cutter boom.

12. The apparatus as defined in claim 11 wherein the hydraulic piston-cylinder is adjustably mounted with an upstanding support leg of said main supporting frame to provide an adjustable range of arc of said cutter boom.

13. The apparatus as defined in claim 1 and further including at least one clamping means for secured positioning of hydraulic hoses on the apparatus.

14. The apparatus as defined in claim 13 wherein said clamping means comprises a generally rectangular housing, a threaded bolt carrying lower clamp plate and turn nuts, wherein an upper free end of said threaded bolt is disposed through an upper portion of said housing to apply compressive force on the hydraulic hoses.

15. The apparatus as defined in claim 1 wherein said cutting teeth are mounted on said cutting wheel by compressively adjustable clamp elements.

16. The apparatus as defined in claim 1 wherein said cutting teeth are mounted in six pairs on said cutting wheel.

17. The apparatus as defined in claim 16 wherein each of said pair of cutting teeth is mounted to project from one-quarter inch to three-quarter inch beyond the radial edge of said cutting wheel.

18. The apparatus of claim 16 wherein said cutting teeth mounted on said cutting wheel include at least one tooth mounted at a 45 degree angle from the planar side surface of said cutting wheel.

19. A hydraulic stump cutting and digging apparatus comprising in combination:
  a mobile vehicle member having a main supporting frame;
  a multidirectional telescopic channel frame cutter boom mounted on said main supporting frame, said cutter boom having an integral elongated channel which acts as a guide for controlling cut material;
  a cutting wheel mounted on the cutter boom and longitudinally aligned with the channel for rotation about a horizontal axis transverse to said channel, said cutting wheel having a plurality of radially extending cutting teeth circumferentially mounted on the cutting wheel;
  hydraulic drive means for powering said cutting wheel mounted contiguously with said cutting wheel and having a common axis for rotation to cut and to convey the cut material through said elongated channel of said cutter boom; and
  at least one hydraulic piston-cylinder mounted on said cutter boom to provide forward and rearward movement of the cutter boom; said hydraulic piston-cylinder being adjustably mounted on an upstanding support leg on said main supporting frame to provide said cutter boom with an adjustable range of arc.

20. The apparatus as defined in claim 2 wherein said elongated channel and said cutting wheel with drive means are mounted on adjustably rotatable mounting means.

21. The apparatus as defined in claim 20 wherein said mounting means comprises two support mounting plates with adjustable cooperating bolt and aperture securement.

22. The apparatus as defined in claim 19 further including a pair of wheels which balance and medially support said main supporting frame.

23. The apparatus as defined in claim 22 wherein each wheel of said pair of wheels is mounted on a separate and individually adjustable axle.

24. The apparatus as defined in claim 23 wherein said individually adjustable axle includes means for telescoping the length of said axle.

25. The apparatus as defined in claim 19 wherein said channel frame of said cutter boom includes flexible side flaps.

26. The apparatus as defined in claim 19 wherein said channel frame telescopic cutter boom is removably attached to said main supporting frame.

27. The apparatus as defined in claim 26 wherein said elongated channel and said cutting wheel with drive means are mounted on adjustably rotatable mounting means.

28. The apparatus as defined in claim 27 wherein said mounting means comprises two support mounting plates with adjustable cooperating bolt and aperture securement.

29. The apparatus as defined in claim 22 and further including a rotatably adjustable guard mounted on said axle for pushing accumulated cut material away from the wheels of the apparatus as the apparatus moves in a forward direction.

30. The apparatus as defined in claim 19 and further including a hydraulic fluid storage tank mounted on said main supporting frame said storage tank comprising an internally mounted "T" baffle.

31. The apparatus as defined in claim 19 and further including a pump, motor and heat exchanger mounted on the main supporting frame for circulation of hydraulic fluid and cooling recirculated fluid from hydraulic components of the apparatus.

32. The apparatus as defined in claim 19 and further including at least one hydraulic piston-cylinder mounted on the channel frame telescopic cutter boom to provide forward and rearward movement of the cutter boom.

33. The apparatus as defined in claim 19 and further including at least one clamping means for secured positioning of hydraulic hoses on the apparatus.

34. The apparatus as defined in claim 33 wherein said clamping means comprises a generally rectangular housing, a threaded bolt carrying lower clamp plate and turn nuts wherein an upper free end of said threaded bolt is disposed through an upper portion of said housing to apply compressive force on the hydraulic hoses.

35. The apparatus as defined in claim 19 wherein said cutting teeth are mounted on said cutting wheel by compressively adjustable clamp elements.

36. The apparatus as defined in claim 19 wherein said cutting teeth are mounted in six pairs on said cutting wheel.

37. The apparatus as defined in claim 36 wherein each of said pair of cutting teeth is mounted to project from one-quarter inch to three-quarter inch beyond the radial edge of said cutting wheel.

38. The apparatus of claim 36 wherein said cutting teeth mounted on said cutting wheel include at least one tooth mounted at a 45 degree angle from the planar side surface of said cutting wheel.

* * * * *